US008050936B1

(12) United States Patent (10) Patent No.: US 8,050,936 B1
Jamotta et al. (45) Date of Patent: Nov. 1, 2011

(54) SCHEDULE PLANNING NETWORK

(75) Inventors: John Jamotta, Hurst, TX (US); Jaime Ibarra, Dallas, TX (US); Brook Sorem, Grapevine, TX (US); Bill Owen, Irving, TX (US); Lonny Hurwitz, Carrollton, TX (US); Mike Friedman, Carrollton, TX (US)

(73) Assignee: Southwest Airlines Co., Dallas, TX (US)

( * ) Notice: Subject to any disclaimer, the term of this patent is extended or adjusted under 35 U.S.C. 154(b) by 851 days.

(21) Appl. No.: 11/613,339

(22) Filed: Dec. 20, 2006

(51) Int. Cl.
*G06Q 10/00* (2006.01)
*G01C 21/00* (2006.01)
(52) U.S. Cl. ......... 705/1.1; 701/200; 701/201; 701/202; 701/203
(58) Field of Classification Search .................. 705/1, 6, 705/1.1; 701/200, 201, 202, 203
See application file for complete search history.

(56) References Cited

U.S. PATENT DOCUMENTS

| 6,134,500 | A  | * | 10/2000 | Tang et al. ..................... | 701/202 |
|-----------|----|---|---------|---------------------------------|---------|
| 7,103,558 | B1 |   | 9/2006  | Patton et al. ..................... | 705/6 |
| 7,333,887 | B2 | * | 2/2008  | Baiada et al. .................. | 701/120 |
| 7,340,405 | B1 | * | 3/2008  | Gunther et al. ................... | 705/6 |
| 2003/0191678 | A1 | * | 10/2003 | Shetty et al. ..................... | 705/8 |
| 2005/0086087 | A1 |   | 4/2005  | Razza et al. ..................... | 705/5 |
| 2005/0090969 | A1 | * | 4/2005  | Siok et al. ..................... | 701/120 |
| 2006/0095156 | A1 |   | 5/2006  | Baiada et al. .................. | 700/213 |
| 2007/0073563 | A1 |   | 3/2007  | Dourthe et al. ................... | 705/5 |

OTHER PUBLICATIONS

Robert Hunt, Time and motion, Jan. 1999, Millennium Mathematics project, university of cambridge, p. 4.*
Aero-the domain of aviation, versin 1.0, Apr. 26, 2004, p. 6-7 http://www.information.aero/registration/policies/doc_archieve/shortcuts040423.pdf.*
NASA Contractor Report 201680—Avaiation System Analysis Capabilities (ASAC) Quick Response System (QRS), Apr. 1997, pp. C-6, D-35.*
Aero—shortcuts 2006.*
NASA contractor report—Aviation System Analysis, Apr. 1997.
Hunt-time and motion, Jan. 1999.
Taylor—The logistic and transportation review, Sep. 1995.
Sabre—Airlite Schedule manager Mar. 2006.

* cited by examiner

*Primary Examiner* — Jami A Plucinski
*Assistant Examiner* — Sangeeta Bahl
(74) *Attorney, Agent, or Firm* — Fish & Richardson P.C.

(57) ABSTRACT

Systems and techniques, including computer-implemented techniques, can be used to receive a base schedule that includes multiple rotations that each include one or more segments. A set of itineraries can be generated based upon the segments in the base schedule, and each itinerary can include an origin, a destination, and one or more segments linking the origin and the destination. The set of itineraries can be automatically analyzed to identify one or more valid itineraries within the set of itineraries, such that each valid itinerary complies with one or more constraints.

20 Claims, 7 Drawing Sheets

SCHEDULE PLANNING NETWORK

BACKGROUND

This description relates to schedule and route planning, and more particularly to developing a schedule that results in an improved allocation of transportation resources.

Commercial airlines typically have significant numbers of aircraft and serve dozens, if not more, of geographically diverse markets. Day-to-day operations require coordination of a variety of different business functions, including crew scheduling, maintenance, equipment scheduling, purchasing, and the like. Because many of the different business functions are interdependent, changes to one aspect of the operations can have an effect on other parts of the overall business. The logistics behind coordinating operations is further complicated by the geographic distribution of markets.

Generally, most of the operations of a commercial airline are centered around flight schedules. As with the coordination of day-to-day operations, the design of the overall flight schedule for a commercial airline involves complex interactions of numerous factors. Schedule design must take into account consumer demand, the ability to make connecting flights, maintenance requirements, gate availability, flight times and distances, airport restrictions and curfews, the number of available aircraft, and the like. Because of these various factors and the need to coordinate other business functions with the overall flight schedule, changes to a schedule design are generally performed weeks or even months in advance of implementing a change. The need for such advance planning limits the flexibility of commercial airlines in adapting to an evolving business environment, increasing efficiency, or otherwise modifying the overall flight schedule.

SUMMARY

In general, in one aspect, a base schedule that includes multiple rotations that each include one or more segments is received. A set of itineraries is generated based upon the segments in the base schedule, and each itinerary includes an origin, a destination, and one or more segments linking the origin and the destination. The set of itineraries are automatically analyzed to identify one or more valid itineraries within the set of itineraries, such that each valid itinerary complies with one or more constraints.

Possible implementations include one or more of the following features. The one or more valid itineraries represents a first set of publishable itineraries. The constraints can include a maximum circuity factor, a maximum switchback angle, a maximum number of segments, a required connection point between segments, or a prohibited connection point between segments. Itineraries of a first type are subject to a first set of one or more constraints and itineraries of a second type are subject to a second set of one or more constraints. Multiple valid itineraries between a first origin and a first destination are analyzed, and one or more preferred itineraries from the valid itineraries are identified. The preferred itineraries represent a second set of publishable itineraries.

In another general aspect, a set of parameters and a flight schedule are received. The set of parameters include information about one or more gates at a station. The flight schedule identifies an arrival time for each flight arriving at the station and a departure time for each flight departing from the station. Each flight arriving at the station or departing from the station is automatically assigned a gate assignment based on the arrival time of each flight and the departure time of each flight, and each gate assignment complies with one or more constraints.

Possible implementations of the invention include one or more of the following features. The constraints can include gate availability, crew availability, remain overnight ("RON") availability, or equipment restrictions. Each flight itinerary departing from the station includes flight segments originating at the station. Each flight itinerary arriving at the station includes flight segments terminating at the station. The one or more gates at a station include hard stands at the station.

The details of one or more implementations are set forth in the accompanying drawings and the description below. Other features will become apparent from the description, the drawings, and the claims.

BRIEF DESCRIPTION OF THE DRAWINGS

FIGS. 6-7 illustrate forms used to display and change parameters.

Like reference numbers and designations in the various drawings indicate like elements.

DETAILED DESCRIPTION

Figure 1:
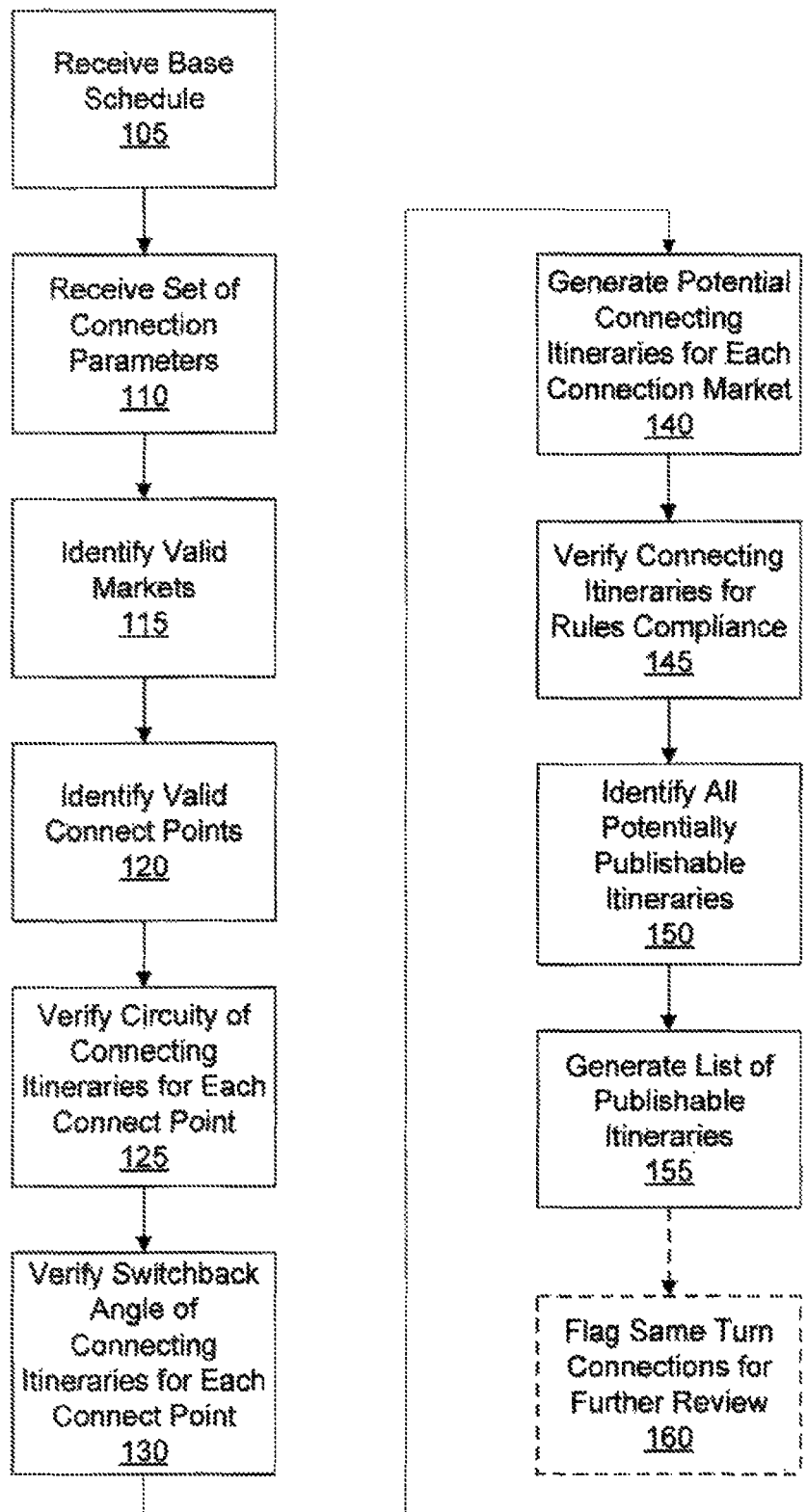
FIG. 1 is a flow diagram of a process for generating an optimized schedule.

FIG. 1 is a flow diagram of a process 100 for generating an optimized schedule in a network of transportation resources. Initially, a base schedule is received (step 105). The base schedule includes a set of rotations. Each rotation represents the assignment of a single aircraft across a single day. For example, a single rotation might have an aircraft that starts the day at Dallas Love Field ("DAL") flies from DAL to Oklahoma City ("OKC"), returns from OKC back to DAL, flies from DAL to Houston Intercontinental ("IAH"), returns from IAH back to DAL, departs DAL for San Antonio ("SAT"), and finally returns from SAT back to DAL, where the aircraft remains overnight. Each airport serviced by an aircraft is referred to as a "station"; in the above example, the stations serviced by this rotation are DAL, OKC, IAH, and SAT. A base schedule is made up of multiple rotations; the schedule can include as many rotations as there are aircraft operated by the airline. However, it is typical for a base schedule to include a few less rotations than the number of aircraft available, to account for factors such as scheduled and unscheduled maintenance. In some implementations, a different set of rotations is implemented for each day of the week.

Typically, the base schedule indicates the specific type of aircraft to be used for each rotation. For example, among the various Boeing 737 aircraft models, an airline might operate the 737-300 model (referred to as a "733"), the 737-500 model (referred to as a "735"), and the 737-700 next generation model (referred to as a "73G"). In one configuration, the 733 can have 137 seats, and has a wing span of approximately 112 feet 7 inches; the 735 has 122 seats and a wing span of approximately 112 feet 7 inches; and the 73G has 137 seats and a wing span of approximately 117 feet 2 inches. Although the rotation is designed to be operated by a specific aircraft model, the rotation need not be operated by the exact same aircraft each day. Aircraft of the same model type can be substituted within a specific rotation, enabling work such as scheduled maintenance to take place without disrupting airline operations. However, a single day's rotation is typically operated by a single specific aircraft, barring unforeseen circumstances.

Each rotation can be divided into one or more flight segments. Each flight segment is a take-off and landing sequence, starting at an origin airport and finishing at a destination airport. Using the sample rotation above, the flight segments within the sample rotation are DAL-OKC, OKC-DAL, DAL-IAH, IAH-DAL, DAL-SAT, and SAT-DAL. In this nomenclature, the airport code before the hyphen represents the departure airport/station, and the airport code after the hyphen represents the arrival airport/station. A rotation that makes multiple stops can be represented by a sequence of airport codes and hyphens, e.g., DAL-IAH-SAT indicates that a particular aircraft departs from DAL, makes a stop at IAH, and then eventually arrives at SAT.

Individual flight numbers can be assigned to one or more successive flight segments within the rotation. For example, DAL-OKC may be assigned flight number 614; OKC-DAL and DAL-IAH are both assigned the flight number 680; IAH-DAL is assigned the flight number 701, DAL-SAT is assigned the flight number 502, and SAT-DAL is assigned the flight number 718. Collectively, all of the flight segments that are assigned the same flight number are referred to as a flight itinerary.

The rotations and flight segments described above are used during the scheduling process. However, different terms are used to describe various aspects of the schedule when the schedule is viewed from a passenger's perspective. A single flight segment within the schedule is referred to as a "nonstop" flight, e.g., a single take-off and landing. For example, if a passenger originated in OKC, and had a final destination of DAL, flight number 680 in the example above would provide this passenger with nonstop service. A "direct" flight is made up of two or more flight segments on a single rotation. For example, if a passenger originated in OKC and had a final destination of IAH, flight number 680 would provide this passenger with direct service, although the passenger would pass through DAL on the way from OKC to IAH. Note that in either case, a passenger need not travel on all of the flight segments that make up a single rotation. In some implementations, each flight segment that is part of a direct flight must have the same flight number.

It is also possible for a passenger to travel on a set of two or more flight segments on different rotations; the connecting flight segments, referred to as "connecting flights," together form a "connecting itinerary." A set of connecting flights, or a connecting itinerary, is defined as two ore more flight segments having unique flight numbers joined together to provide service between an origin station and destination station. As an example, several different connecting itineraries can be created from the following four flight segments. Flight 680 includes two flight segments, OKC-DAL and DAL-IAH, and flight 11 includes two flight segments, DAL to New Orleans ("MSY"), and MSY to Birmingham, Ala. ("BHM"). Both the DAL-IAH and DAL-MSY flight segments leave DAL at the same time. One possible connecting itinerary would be from OKC to MSY, on flight 680 from OKC-DAL and connecting in DAL to flight 11 from DAL-MSY. Similarly, another possible connecting itinerary is from OKC to BHM, on flight 680 from OKC-DAL and on flight 11 from DAL-MSY as well as MSY-BHM. Note that if a passenger was traveling from DAL to BHM on flight 11, it would be considered a direct flight, as it only requires travel on a single flight itinerary, even though it includes two flight segments.

A similar nomenclature to that described above can be used to denote nonstop, direct, or connecting flights. For example, DAL-IAH-SAT describes travel from DAL to IAH, and then from IAH to SAT, either on the same flight or on a different flight. It is important to note that without additional information, DAL-IAH-SAT provides no indication as to whether this is a direct flight or a set of connecting flights (it cannot be a nonstop flight, as a stop is required at IAH). However, the distinction between a direct flight or a set of connecting flights is typically obvious from the context, e.g., if only one flight number is provided (direct flight), or if two flight numbers are provided (set of connecting flights). The process 100 receives a set of connection parameters (step 110). A user, such as a schedule planner for the airline, can indicate the specific connection parameters to be received by the process 100. The set of connection parameters customize the rules used to generate the optimized schedule, discussed in further detail below. The set of connection parameters can include a parameter indicating whether a validate Wright Amendment rule is applied, a maximum circuity permissible, a maximum switchback angle allowed, a switchback angle buffer, minimum and maximum connect times, maximum number of stops, and a maximum number of connections. These parameters will be described in further detail below.

In some implementations, the user can select from one or more predefined sets of connection parameters. These predefined sets of connection parameters can include a set of connection parameters for ordinary passenger travel, a set of connection parameters for cargo use, and a set of connection parameters for nonrevenue passenger travel. In other implementations, the user can manually define each of the connection parameters within the set of connection parameters, or make one or more modifications to a predefined set of connection parameters.

All valid markets are identified within the base schedule (step 115). Each flight segment within the base schedule is identified, and a sequenced list of unique stations is generated. Each station within the sequenced list is paired with every other station within the sequenced list, and each of these pairings is a market; all of the pairings together represent all possible markets serviced. Each market includes an origin station and destination station—together, the origin airport and destination airport can be referred to as an origin and destination ("O&D") station pair or as an O&D market pair. The possible markets can be expressed as a matrix, with the origin stations along one dimension and the origin stations along the other dimension.

In addition, each O&D market pair can be classified as a short-haul market, medium-haul market, or long-haul market, depending on the distance between the origin airport and destination airport. For example, in some implementations, O&D station pairs less than 750 miles apart can be classified as short-haul markets; O&D station pairs greater than 2000 miles apart can be classified as long-haul markets, and the remaining O&D station pairs can be classified as medium-haul markets.

However, not all possible markets will actually have service; a variety of rules are applied to each of the markets within the possible markets matrix to identify all of the possible connecting markets. A validate same station rule verifies that the same station does not exist as both an origin and destination of the market; if the market fails to comply with this rule, it is excluded from consideration as a connecting market. A validate Wright Amendment rule verifies that the market does not violate the Wright Amendment. The Wright Amendment (and the related Shelby Amendment), in general, prohibits airline tickets from being sold for travel between Dallas Love Field and any airport not located within Texas, Louisiana, Arkansas, Oklahoma, New Mexico, Alabama, Mississippi, and Kansas.

A validate nonstop market only rule can be applied to verify that a market is not built for an O&D station pair that does not allow connecting itineraries. For example, an O&D station pair might not allow connecting itineraries because the O&D pair is already adequately served by nonstop flights. Any market that appears on the "nonstop market only" list received as part of the system connection parameters is excluded from consideration as a connecting market. A validate multiple airport code (MAC) rule can be applied to verify that the stations in a market created do not contain the same MAC. For example, Houston has two airports, IAH and HOU; both of these airports are assigned the same MAC of "QHO."

Individual parameters within the connection rules parameters can indicate whether a specific rule is applied or not; for example, if the Wright Amendment parameter is "off," the validate Wright Amendment rule is not applied to the possible markets matrix.

The process 100 identifies all valid connect points for all valid markets identified in step 115 (step 120). A market's origin, destination, and one or more connect points is a connection market. For example, if the market origin is DAL, the market destination is MSY, with a connect point of HOU, DAL-MSY-HOU is a connection market. An individual parameter within the connection rules parameter can limit the number of connect points in a connection market; for example, an upper limit of one connect point can be imposed for passenger convenience.

To identify all valid connect points, each possible connect point for each valid market is identified. Each valid market identified in step 110 is combined with each unique station in the sequenced list previously generated. The process 100 identifies as many connection points as defined in the connection rules parameter. After every possible connect point for each valid market is identified, a set of rules are applied to determine the valid connect points for each valid market.

The validate same station rule makes sure that the connect point is not the same station as either the origin station or destination station of the market. If the connect point is the same station as either the origin station or destination station, the connect point is discarded from further consideration. The validate Wright Amendment rule verifies that a connect point does not create a connecting itinerary that violates the Wright Amendment, described above; if the connect point results in an itinerary that violates the Wright Amendment, the connect point is discarded from further consideration. The validate multiple airport code (MAC) rule verifies that a connect point does not create a connecting itinerary that includes the same MAC, e.g., IAH-HOU-DAL is a connecting itinerary that includes the same MAC; if the connect point results in a connecting itinerary that includes the same MAC, the connect point is discarded from further consideration.

As above, individual parameters within the connection rules parameters can indicate whether a specific rule is applied or not during this step; for example, if the Wright Amendment parameter is "off," the validate Wright Amendment rule is not applied to identify connect points that result in an itinerary that violates the Wright Amendment.

Figure 2:
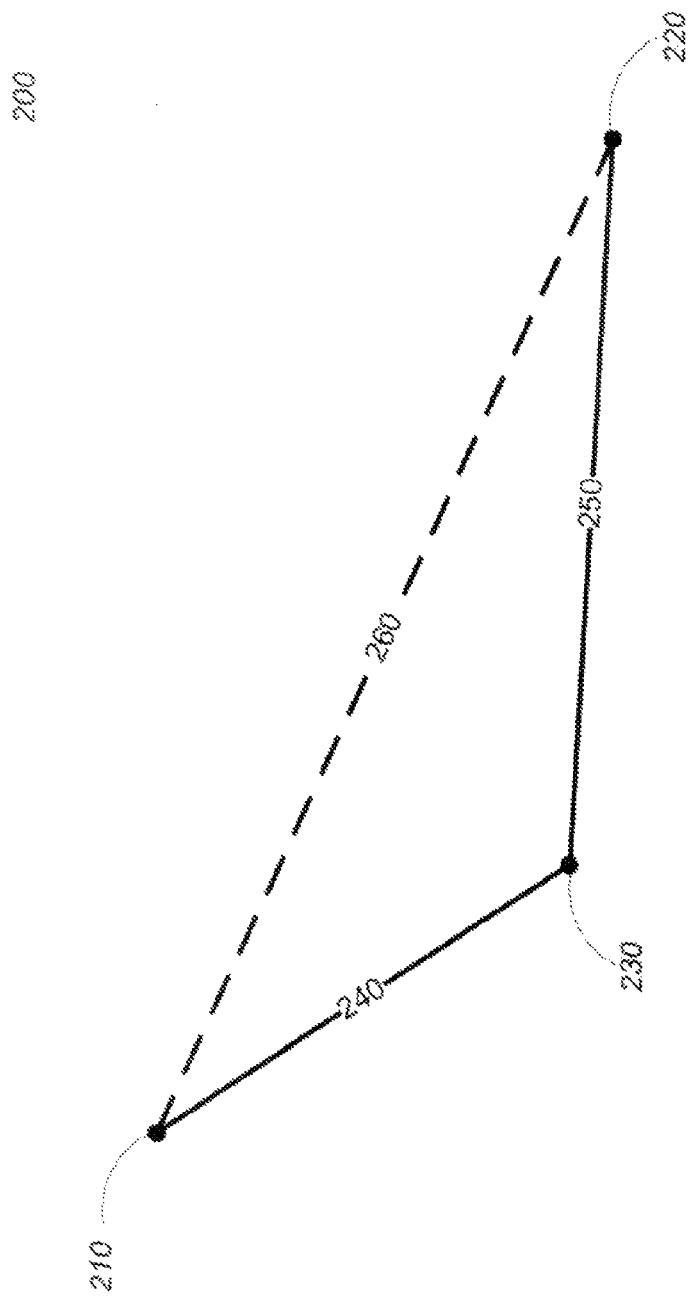
FIGS. 2 and 3 are schematic representations of a connecting itinerary.

The circuity of the connecting itinerary for each connect point is determined (step 125). The circuity of a connecting itinerary is calculated by dividing the total itinerary mileage for the connecting itinerary by the non-stop market mileage. An illustration of the circuity calculation is shown in FIG. 2. An origin market station 210 and a destination market station 220 are shown, as well as a potential connect point 230. The distance 240 between the origin market station 210 and the connect point 230 is determined, and the distance 250 between the connect point 230 and the destination market station is determined. In addition, the distance 260 between the origin market station 210 and the destination market station 220 is also determined. In some implementations, the distance is determined based on the United States Department of Transportation's distance calculation formula.

The distance 240 is added to the distance 250, resulting in the total itinerary mileage for the connecting itinerary. This result is divided by the distance 260, and results in a circuity value. For example, if the origin market station 210 is DAL, the destination market station 220 is MSY, and the connect point 230 is HOU, distance 240 is 233 miles, distance 250 is 310 miles, and distance 260 is 543 miles. The total itinerary mileage for the connecting itinerary is 543 miles, the sum of distance 240 and distance 250. Therefore, the circuity factor is $$\frac{233+310}{543},$$

or 1.21.

The calculated circuity is compared to the applicable circuity specified in the connection parameters. If the calculated circuity is greater than the circuity specified, the connect point is discarded from further consideration. Different levels of circuity can be applied in different situations, depending on the values in the connection parameters. For example, a system-wide maximum circuity factor can be defined; in addition, a separate circuity factor can be defined that applies to a particular origin station, O&D market, or even a specific connection itinerary. In addition, different circuity factors can be defined for itineraries that fall within a certain distance range; for example, a maximum circuity factor of 1.2 can apply to short-haul itineraries, a maximum circuity factor of 1.4 can be applied to medium-haul itineraries, and a maximum circuity factor of 1.5 can be applied to long-haul itineraries. When more than one maximum circuity value applies to a specific itinerary, the process 100 applies the most restrictive circuity value defined in the connection parameters. In some implementations a circuity buffer can also be defined in the connection parameters; the circuity buffer is smaller than the circuity factor specified in the connection parameter. If the calculated circuity for a particular connection itinerary is greater than the specified circuity factor, but less than the specified circuity buffer, the connecting itinerary is retained for further consideration and is flagged for further review by a user.

Figure 3:
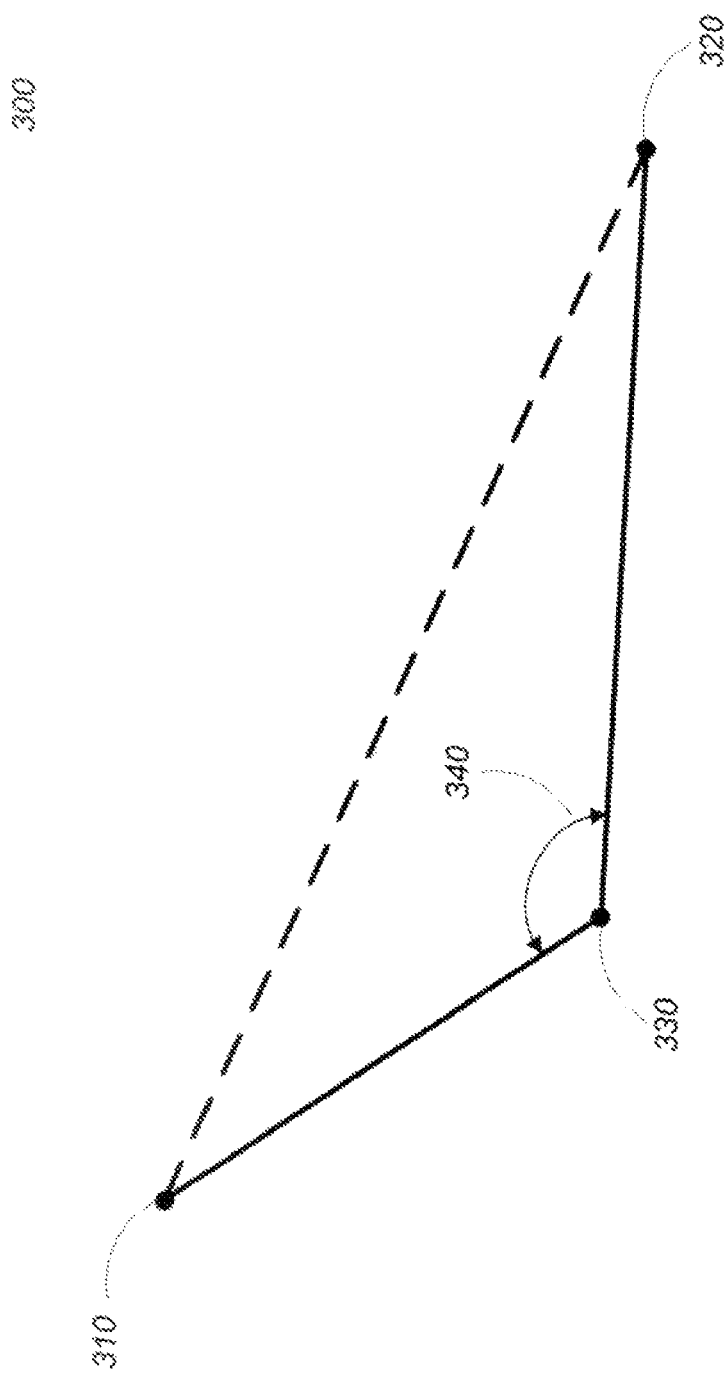

The switchback angle of the connecting itinerary for each connect point is determined (step 130). The switchback angle is the angle formed by the geographic flight path of a connecting itinerary. FIG. 3 shows an origin market station 310 and a destination market station 320, as well as a potential connect point 330. The angle 340 formed by the connecting itinerary is the switchback angle. The switchback angle calculated for a particular connection itinerary is compared to the switchback angle specified in the connection parameters. If the calculated switchback angle is greater than the switchback angle specified, the connect point is discarded from further consideration.

Different levels of switchback angle can be specified in different situations, depending on the values in the connection parameters. For example, a system-wide maximum switchback angle can be defined; in addition, a separate switchback angle can be defined that applies to a particular origin station, O&D market, or even a specific connection itinerary. In addition, different maximum switchback angles can be defined for itineraries that fall within a certain distance range; for example, a maximum switchback angle of 70 degrees can apply to short-haul itineraries, a maximum switchback angle of 100 degrees can be applied to medium-haul itineraries, and a maximum switchback angle of 120 degrees can be applied to long-haul itineraries. When more than one maximum switchback angle applies to a specific itinerary, the process 100 applies the most restrictive switchback angle defined in the connection parameters. In some implementations a switchback angle buffer can also be defined in the connection parameters; the switchback angle buffer is smaller than the switchback angle specified in the connection parameter. If the switchback angle for a particular connection itinerary is greater than the specified switchback angle, but less than the specified switchback angle buffer, the connecting itinerary is retained for further consideration and is flagged for further review by a user.

The permissible connection times for each connect point are identified (step 130). Each possible connecting itinerary is governed by a minimum and maximum connection time at the connect point. For example, a typical implementation requires a minimum of 45 minutes of connection time at the connection point, i.e., at least 45 minutes must elapse between the arrival of the inbound flight into the connect point and the departure of the outbound flight from the connect point. A typical implementation also requires that no more than four hours of connection time occur at a single connection point. The connection parameters define at least one set of minimum and maximum connection times. Additional minimum and maximum connection times can be defined for special circumstances, e.g., for a specific connect point, O&D market, origin station, connecting itinerary, or day of week. For example, a specific connect point that is unusually congested or unusually large might require additional time to allow passengers to make a connection, and the minimum connection time for this connect point could be raised to one hour. As another example, Tuesdays and Wednesdays generally have lower passenger loads, so the minimum connection time for these days might be lowered to 30 minutes.

The process 100 generates potential connecting itineraries for each market and connect point in the connection markets list based upon the flights (nonstop or direct) included in the base schedule (step 140). For example, if the minimum connect time is 45 minutes, and the maximum connect time is four hours, a flight from Providence ("PVD") to Baltimore-Washington International ("BWI") arriving at 8:00 am could potentially provide a connection to any flight that departs BWI between 8:45 am and 12:00 noon. If a flight departing BWI during this time frame results in a link between the origin station PVD and a destination station via the connect point BWI, the PVD-BWI flight and the particular flight departing BWI are joined together to form a potential connecting itinerary. In some implementations, multiple flights can be joined at multiple connect points to create a potential connecting itinerary.

The potential connecting itineraries are verified to ensure compliance with rules and restrictions that apply to connecting itineraries (step 145). The validate same station rule can be applied to verify that the same station does not exist in the combined itineraries of the two or more connecting flights, by checking for unique stations in each flight segment's origin and destination compared to all of the other origins and destinations. If a potential connecting itinerary does not pass this test, it is discarded from further consideration as a potential connecting itinerary. For example, if the origin station is El Paso ("ELP"), and the destination station is Amarillo ("AMA"), a first flight EMP-AMA-DAL connecting to a second flight DAL-AMA fails the validate same station rule, as this connecting itinerary passes through AMA twice.

The validate Wright Amendment rule can also be applied to verify that the connecting itinerary does not violate the Wright Amendment, as described above. The validate MAC rule can be applied to verify that the connecting itinerary does not contain the same MAC. If either of these rules are violated, the connecting itinerary is discarded from further consideration as a potential connecting itinerary.

In addition, the number of stops for each potential connecting itinerary is calculated. A stop can include either the connect point or a stop on a direct flight that makes up part of a connecting itinerary. In some implementations, the number of stops at connect points is distinguished from the number of stops on direct flights. If the number of stops for a potential connecting itinerary exceeds the limit defined in the connection parameters, the potential connecting itinerary is discarded from further consideration as a potential connecting itinerary. For example, if the maximum number of stops indicated in the connection parameters is two, and the maximum number of connect points indicated in the connection parameters is one, the following types of connecting itineraries are acceptable: a nonstop flight connecting to a nonstop flight (one connect point, one stop); a nonstop flight connecting to a one-stop direct flight (one connect point, two total stops); and a one-stop direct flight connecting to a nonstop flight (one connect point, two total stops). A one-stop direct flight connecting to a one-stop direct flight would not be acceptable under these sample parameters, as the number of total stops for this connecting itinerary is three, even though there is only one connect point. Similarly, a non-stop connecting to a two-stop direct flight would also not be acceptable under these sample parameters, as the number of total stops for this connecting itinerary is three.

The circuity of a potential connecting itinerary is verified. The circuity can be calculated as described above; the total itinerary mileage for the connecting itinerary is the sum of each flight segment in the connecting itinerary. For example, if the connecting itinerary includes a nonstop from HOU to Austin ("AUS"), and a connection to a one-stop direct flight AUS to Los Angeles ("LAX"), with a stop in Phoenix ("PHX"), the total itinerary mileage is the sum of the distance from HOU to AUS (148 miles), AUS to PHX (867 miles), and PHX to LAX (373 miles), a total of 1388 miles. If the circuity of a potential connecting itinerary is greater than the circuity allowed as specified in the connection parameters, the potential connecting itinerary is discarded from further consideration. Similarly, if the circuity of a potential connecting itinerary is less than the circuity buffer but greater than the circuity allowed as specified in the connection parameters, the potential connecting itinerary is flagged for potential future review by the user. If the potential connecting itinerary does not include a direct flight, the circuity need not be verified, as it will be the same as that previously calculated for the O&D market pair with the specified connect point. Further, in this situation, since the connect point was already verified as meeting the circuity allowed as specified in the connection parameters, further verification is not required.

The switchback angle of the potential connecting itinerary is also verified. The switchback angle is calculated for any direct flight that is part of a connecting itinerary, and is compared to the permitted switchback angle as specified in the connection parameters. The switchback angle is calculated as described above. If the switchback angle is greater than that permitted, the potential connecting itinerary is discarded from further consideration. For example, if a connecting itinerary includes a direct flight from Tampa ("TPA") to HOU with a stop in MSY, and a connection to a nonstop flight from HOU to LAX, the switchback angle for TPA-MSY-HOU is calculated as compared to a nonstop flight from TPA-HOU. The switchback for the potential connecting itinerary as a whole need not be verified, as it will be the same as that previously calculated for the O&D market pair with the specified connect point. Further, in this situation, since the connect point was already verified as being less than the maximum switchback angle allowed as specified in the connection parameters, further verification is not required if the potential connecting itinerary does not include a direct flight.

At this point, all of the potentially publishable connecting itineraries are identified (step 150). Once all of the discarded potential connecting itineraries are removed from consideration, the remaining connecting itineraries all represent valid connections. Depending on the needs of the airline, specific itineraries can be added to the list of valid connecting itineraries, even if they include connecting itineraries previously discarded or connecting itineraries that were otherwise not identified by the previous steps. In addition, depending on the needs of the airline, specific valid connecting itineraries can be discarded from the list of valid connecting itineraries. Comments can be added either manually or automatically to discarded potential connecting itineraries. For example, automatic comments can indicate why the potential connecting itinerary was discarded (e.g., violated Wright Amendment restrictions, exceeded maximum circuity, exceeded maximum switchback angle, etc.). After these changes are made, the resulting list of connecting itineraries is the list of potentially publishable connecting itineraries.

The list of potentially publishable connecting itineraries can include the following information for each connecting itinerary in the list: the departure station, arrival station, departure time, and arrival time for each flight that is included in the connecting itinerary, the total stops of the connecting itinerary, the total mileage for the connecting itinerary, the connect point station for the itinerary, the frequency of the itinerary (e.g., daily, or the specific day or days that the connecting itinerary is flown), as well as a full itinerary for the connecting itinerary, including en route stations and the corresponding connection or stopover times at each en route station. The frequency of a particular connecting itinerary is the intersection of the frequency of each of the flights that makes up the connecting itinerary. For example, if the first flight of a connecting itinerary operates daily, and the second and final flight of the connecting itinerary operates every day except Sunday, the connecting itinerary has a frequency of every day except Sunday. As another example, if a first flight of a connecting itinerary operates on Thursday, Friday, and Sunday, and the second and final flight of the connecting itinerary operates Friday, Saturday, Sunday and Monday, the connecting itinerary has a frequency of Friday and Sunday.

The potentially publishable connecting itineraries are evaluated, and a list of publishable itineraries is generated (step 155). All nonstop flights are added to the list of publishable itineraries. Next, each direct flight within a particular O&D market is evaluated against the other alternative flights and itineraries within the O&D market, and the direct flight is added to the list of publishable itineraries as long as none of the following exceptions apply: (a) a nonstop departs the origin station at the same time or later than the direct flight under consideration, and the nonstop arrives at the destination station earlier or at the same time as the direct flight under consideration; (b) if a second direct flight depart the origin station and arrives at the destination station at the same time as the direct flight under consideration, and the second direct flight has a lower total itinerary mileage than the direct flight under consideration; (c) a second direct flight departs the origin station at the same time or later than the direct flight under consideration, and the second direct flight arrives at the destination station earlier or at the same time as the direct flight under consideration; or (d) a connecting itinerary departs the origin station later than the direct flight under consideration, the connecting itinerary arrives at the destination station earlier than the direct flight under consideration, and the connecting itinerary has fewer stops than the direct flight under consideration. Other additional or alternative exceptions can be used.

Then, each connecting itinerary within a particular O&D market is evaluated against the other alternative flights and itineraries within the O&D market, and the connecting itinerary is added to the list of publishable itineraries as long as none of the following exceptions apply: (a) a nonstop flight departs the origin station at the same time or later than the connecting itinerary under consideration, and the nonstop flight arrives at the destination station earlier or at the same time than the connecting itinerary under consideration; (b) a direct flight departs the origin station at the same time or later than the connecting itinerary under consideration, and the direct flight arrives at the destination station earlier or at the same time than the connecting itinerary under consideration; (c) a direct flight has the same first flight segment as the connecting itinerary under consideration; (d) a direct flight departs from the origin station at the same time or later than the connecting itinerary under consideration, the direct flight arrives at the origin station later than the connecting itinerary under consideration, but no later than the itinerary buffer time, and the direct flight has fewer stops than the connecting itinerary under consideration; (e) a second connecting itinerary departs the origin station and arrives at the destination station at the same time as the connecting itinerary under consideration, and the second connecting itinerary has a greater connect time than the connecting itinerary under consideration; (f) a second connecting itinerary departs the origin station at the same time or later than the connecting itinerary under consideration, and arrives at the destination station earlier than or at the same time as the connecting itinerary under consideration; or (g) a second connecting itinerary departs the origin station at the same time or later than the connecting itinerary under consideration, the second connecting itinerary arrives at the destination station later than the connecting itinerary under consideration, but no later than the itinerary buffer time, and the second connecting itinerary has fewer stops than the connecting itinerary under consideration. In the situation where two connecting itineraries depart the origin station and arrive at the destination station at the same time, and both connecting itineraries have the same connect time, the user is prompted to select the connecting itinerary that is included in the list of publishable itineraries. The itinerary buffer time can also be referred to as the quality improvement buffer. Again, other additional or alternative exceptions can be used.

In some implementations, a quality improvement buffer can be applied to refine the list of publishable itineraries. Rather than selecting itineraries strictly based on the total itinerary time, the quality improvement buffer analyzes the list of potentially publishable connecting itineraries for each O&D market and selects itineraries based on both the total itinerary time as well as the passenger desirability of the itinerary. For example, a first possible direct flight between LAX and Detroit ("DTW") might be LAX-Salt Lake City ("SLC")-Chicago Midway ("MDW")-DTW, while a second possible direct flight might be LAX-Las Vegas ("LAS")-DTW. The first direct flight might have a slightly shorter total time between LAX and DTW, but the second direct flight is preferable from a passenger perspective as it requires only one stop rather than two stops.

In addition, there are buffers that can consider itineraries that fail to meet one or more of the rules described above (e.g., circuity, switchback, connection time, etc.), but that fall within a certain buffer range for the rule or rules that would otherwise not be met by the itinerary. The buffer range is defined in absolute terms, e.g., an itinerary can have a circuity no more than 0.1 greater than the maximum circuity parameter. The buffer range can be defined globally for all itineraries or multiple buffer ranges can be provided for different subsets of itineraries, e.g., by total distance or O&D market.

Finally, the list of publishable itineraries is analyzed to verify that duplicate itineraries do not appear in the list; any duplicate itineraries found in the list are deleted, so that each itinerary only appears in the list once.

Optionally, same turn connections can be flagged for further review by the user (optional step 160). A same turn connection occurs when a passenger deplanes from an aircraft at a connect point, only to re-board the same aircraft to continue their journey. Although same turn connections are valid (and publishable) connections, this type of connection can appear to be inefficient from a passenger's perspective, as it requires the passenger to disembark and re-board the exact same aircraft (unlike a direct flight, where the passenger is permitted, if not required, to remain on the aircraft during a stop). Therefore, the user may elect to exclude same turn connections from the list of publishable itineraries. Same turn connections can be identified using the rotations in the base schedule. For example, a rotation might begin with flight 687, which operates LAX-PHX-AUS. The following flight 1838 in the rotation operates AUS-DAL-MSY. A connecting itinerary PHX-AUS-DAL on flights 687 and 1838 would otherwise meet all of the rules and restrictions identified above; however, this connecting itinerary represents a same turn connection.

In some implementations, as described above, the validate Wright Amendment rule can be turned off. Although the Wright Amendment prohibits tickets from being sold to passengers between Dallas Love Field and the states not otherwise specified in the Wright Amendment, it does not prohibit the use of nonrevenue tickets (e.g., employee pass travel and frequent flyer reward tickets) for such an itinerary, nor does it prohibit cargo from being transported to the non-specified states. Therefore, it can be useful for a second schedule to be generated for internal airline use that does not make use of the validate Wright amendment rule. In other implementations, the requirements relating to the maximum number of stops and maximum number of connections can be ignored. This is useful for generating an additional schedule for internal airline use for cargo transportation purposes, because unlike passengers, boxes and pallets are not affected by multiple stops or connections.

Figure 4:
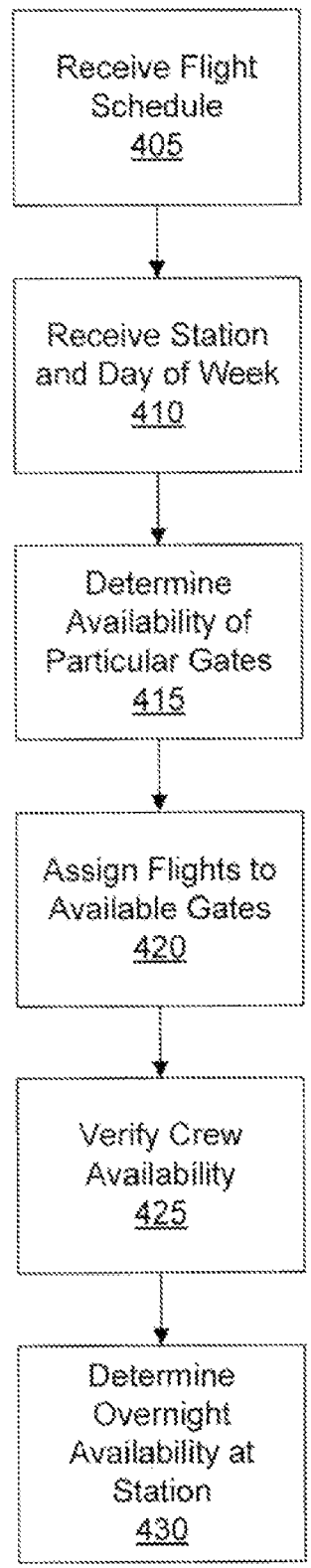
FIG. 4 is a flow diagram of a process for assigning gates.

FIG. 4 is a flow diagram of a process 400 for assigning gates using a minimum number of gates at a station. In the broadest sense, a gate is a parking location at an airport for a single aircraft. Typically, gates are located adjacent to airport terminal buildings, and gates located adjacent to the terminal may or may not be equipped with passenger boarding bridges. However, although rare, gates can also be located away from a terminal building in a more remote location; remote gates are typically referred to as hard stands. In this instance, passengers are usually bussed between the hard stand and the terminal building. In some circumstances, hard stands may be used as remote parking, but are not used for ordinary passenger enplaning and deplaning; under these circumstances, an aircraft located at a hard stand is not in passenger revenue service, and the aircraft must be brought to a terminal gate to be placed into service.

Each flight that operates at a particular station must be assigned a gate so that passengers, baggage, and cargo can be loaded and unloaded. Although some airport gates can handle all aircraft, most gates are limited in some way. For example, a gate might be able to handle a 733, but not a 73G, due to its increased width. As another example, certain gates might be only be usable for domestic flights, because they are not connected to a federal inspection station. In addition, some gates may have temporary limitations. For example, a gate might be able to handle either a 733 or a 73G if an adjacent gate is unoccupied, but can only handle a 733 if the adjacent gate is occupied. Alternatively, a gate might be able to handle either a 733 or 73G if an adjacent gate is unoccupied or occupied by a 733, but the gate can only handle a 733 if the adjacent gate is occupied by a 73G. All of these restrictions must be taken into account when assigning a particular aircraft to a gate.

A flight schedule is received by the process 400 (step 405). The user can select a flight schedule for which gates need to be assigned, or for which the user wishes to determine if gates can be assigned in a more efficient manner. The format of the flight schedule is described above with regards to the base schedule. A station and day of week are received (step 410). The user selects a station for which gates need to be assigned or potentially reassigned, as well as a day of the week. In one implementation, the process 400 can be repeated if the user wishes to have gates be assigned or reassigned for multiple days of the week, or at multiple stations.

The availability of particular gates is determined (step 415). First, the maximum number of gates available is determined by determining the gates that are active and available for the day of week previously selected. In one implementation, if multiple days are selected, the smallest number of gates available across all of the days under consideration is used as the maximum number of gates available. The status of a particular gate, e.g., whether a gate is active or inactive, as well as whether a particular gate is available on a specific day of the week is stored in a set of station gate/remote parking parameters.

Flights are assigned to available gates (step 420). The flights are assigned to individual gates based on several different parameters, in addition to details contained in the flight schedule. The process 400 takes each flight at a station and assigns it to one of the available gates chronologically throughout the day in ascending order. Flights originating at the station are assigned based on their departure time; flights terminating at the station are assigned based on their arrival time; and all other flights are assigned by comparing the arrival time of the current flight to the departure time of the prior flight at the gate. In any of these cases, all station and gate restrictions must be verified.

A particular gate must be available during the time of day for the flight that the process 400 is trying to assign. A gate's availability can be determined from the gate's exception set within the set of station gate/remote parking parameters. If a gate is not available for the entire time that a particular flight requires the gate, this verification step fails. For example, if a gate is available from the start of service until 4:30 pm, a flight arriving at 4:10 pm and departing at 4:40 pm cannot be assigned to this gate, as the gate is not available for the entire length of time that the flight requires a gate, and an alternate gate must be assigned.

If the station that the flight is arriving from has been isolated to arrive at a specific gate, referred to as an isolated gate, the process 400 assigns this flight to the isolated gate. For example, a particular station might require that all flights arriving from DAL be assigned to a single gate. Similarly, if the station that the flight is departing to has been isolated to depart at a specific gate, the process 400 assigns that flight to the isolated gate. Both the arrival gate isolation information and the departure gate isolation information are defined in the set of station gate/remote parking parameters. In addition, if a gate has been designated as an arrival or a departure isolated gate only in the set of station gate/remote parking parameters, then the process 400 can only assign flights from the arrival station or flights to the departure station to that particular gate; the only exception to this rule is if another flight can be assigned to an isolated gate without conflicting with a flight to or from one of the isolated markets.

In addition the gate assigned to a particular flight must be able to handle the equipment type of the flight. As mentioned above, a gate can have an equipment restriction if the gate can only handle certain types of aircraft. The process 400 verifies that the gate to be assigned can handle the type of equipment being used for the flight; if the gate to be assigned cannot handle the flight because of an equipment restriction, another gate is selected. In addition, the process 400 verifies that the adjacent gates to the gate to be assigned can also permit the equipment type used for the flight; for example, as described above, it is possible that between two adjacent gates, either one can handle a 73G, but if one of the two gates is currently occupied by a 73G, the other gate cannot also be used for a 73G.

An appropriate gate buffer for the gate is calculated. The gate buffer is the time required after a first flight leaves a gate before the gate can accept the next arriving flight. The gate buffer can depend on a number of factors, including the station originator stagger rate, the remote originator separation, the station terminator stagger rate, and a gate buffer parameter defined for the specific station, specific gate, and/or a specific flight. Each of three types of flights will be considered in sequence: originating flights (the first leg of a flight departs from the station under consideration), terminating flights (the last leg of a flight arrives into the station under consideration), and other flights.

The process 400 attempts to spread all originating flights from a station across all available gates at the station. The departure time of each originating flight must be separated by at least the station's originator stagger rate. In addition, flights that depart from the same gate (i.e., in succession) must be verified against the remote originator separation rate. For example, if there are more originating flights than available gates, the process 400 uses an appropriate hierarchy level of the remote originator separation as the required time between the two originator departures at the same gate, with the lowest level taking precedence. The remote originator separation hierarchy, from lowest level to highest level, is (1) remote originator separation exception if present; (2) gate level remote originator separation if present; (3) station level remote origination separation if present; and finally (4) system level remote origination separation. For example, if there are three gates and five originating flights, the system would assign the first three originating flights to the three gates in departure order. The departure times would be validated against the station's originator stagger rate, and then the remote originator separation (as well as the other limitations) is used to assign the remaining two flights to the appropriate gates.

Similarly, the process 400 attempts to spread all terminating flights to a station across all available gates at the station. The arrival time of each terminating flight (either gate or remote parked) must be separated by at least the station's terminator stagger rate. If there are more terminating flights than available gates, the process 400 uses an appropriate hierarchy level of the remote terminator separation as the required time between the two terminator arrivals at the same gate, with the lowest level taking precedence. The remote originator separation hierarchy, from lowest level to highest level, is (1) remote terminator separation exception if present; (2) gate level remote terminator separation if present; (3) station level remote terminator separation if present; and finally (4) system level remote terminator separation. For example, if there are three gates and five terminating flights, the system would assign the first three terminating flights to the three gates in arrival order (as long as these assignments do not violate other restrictions, such as equipment type). The remote terminator separation (as well as the other limitations) is then used to assign the remaining two flights to the appropriate gates.

Otherwise, if the flights are not both originating flights or both terminating flights, the process 400 uses the appropriate hierarchy level of the gate buffer to determine minutes required between the departure of one flight and the arrival of the next flight at a specific gate (e.g., departure of an originating flight and the arrival of a non-originating flight, the departure of a non-terminating flight and the arrival of a terminating flight, or a regular departure and arrival), with the lowest level taking precedence. The gate buffer hierarchy, from lowest level to highest level, is (1) gate buffer exception if present; (2) gate level gate buffer if present; (3) station level gate buffer if present; and finally (4) system level gate buffer.

Crew availability is verified (step 425). The process 400 determines if a crew is available to work all flights at the station, using several of the parameters in the schedule's station parameter set. A crew includes all personnel necessary to work a single gate; a crew can include one or more persons. The parameters include staffed gates, which indicates the number of crews available at the station by time of day and day of week; originator work duration, which indicates the time a crew will be working on an originating flight before it departs (in essence, generating an artificial arrival time for the originating flight); and terminator work duration, which indicates the time a crew will be working on a terminating flight after it arrives (in essence, generating an artificial departure time for the terminating flight).

The process 400 determines how many flights are being worked by a crew at the same time by taking the arrival time of the previous flight assigned to a specific gate and the departure time of that same flight, and then checking to see how many other gates have flights being worked at that time. For example, if a flight arrives at gate C1 at 8:30 am and the next flight departing from that same gate is at 8:50 am, the process checks the time range of 8:30 am-8:50 am, and if any flight arrives, departs, or is being worked at another gate during that time, it will be added to the number of crews needed. The number of crews needed is checked against the staffed gates parameter for that specific day of week and time of day, and if the number of crews needed is less than the number of staffed gates, than the crews needed is considered valid. As described above, for terminating or originating flights, an artificial arrival or departure time is calculated from the originator work duration or terminator work duration parameter, and the artificial arrival or departure time is used to determine the number of crews needed.

A station's ability to allow aircraft to remain overnight is determined (step 430). Each gate or hard stand available for overnight parking is referred to as a "RON." The process 400 determines the specific RONs at the station that are available using parameters from the gate/remote parking information within the schedule's station parameters. In order to calculate the maximum RONs available, the process determines the RONs that are active and available for that day by using the gate/remote parking information. For any schedule, either a seven-day schedule or less than seven day schedule, the process uses the lowest number of RONs that are available. Therefore, the RON has to be effective and active for the entire schedule in order to be considered an active and available.

The process assigns terminating flights to RONs that are active for the entire date range of the schedule. The process verifies the RON's active indicator parameter in the schedule's station parameter set, that the RON is available for scheduling on the selected day of the week, and that the RON can handle the type of equipment used to operate the terminating flight.

Once the valid RONs are determined, the process assigns each terminating flight a RON identifier. If the terminating flight arrives at a gate that can also serve as a RON, and it is the last terminator of the day to use that gate, then the terminating flight will receive that gate/RON identifier. If there is another terminating flight that will use that gate, the first terminating flight is assigned the next available remote parking spot identifier and the last terminating flight assigned to the gate will receive that gate/RON identifier. The process continues to assign all terminating flights until all flights at the station have been assigned a RON, or until no more RONs are available If no more RONs are available, the process 400 can alert the user that one or more terminating flights do not have a RON assigned.

Figure 5:
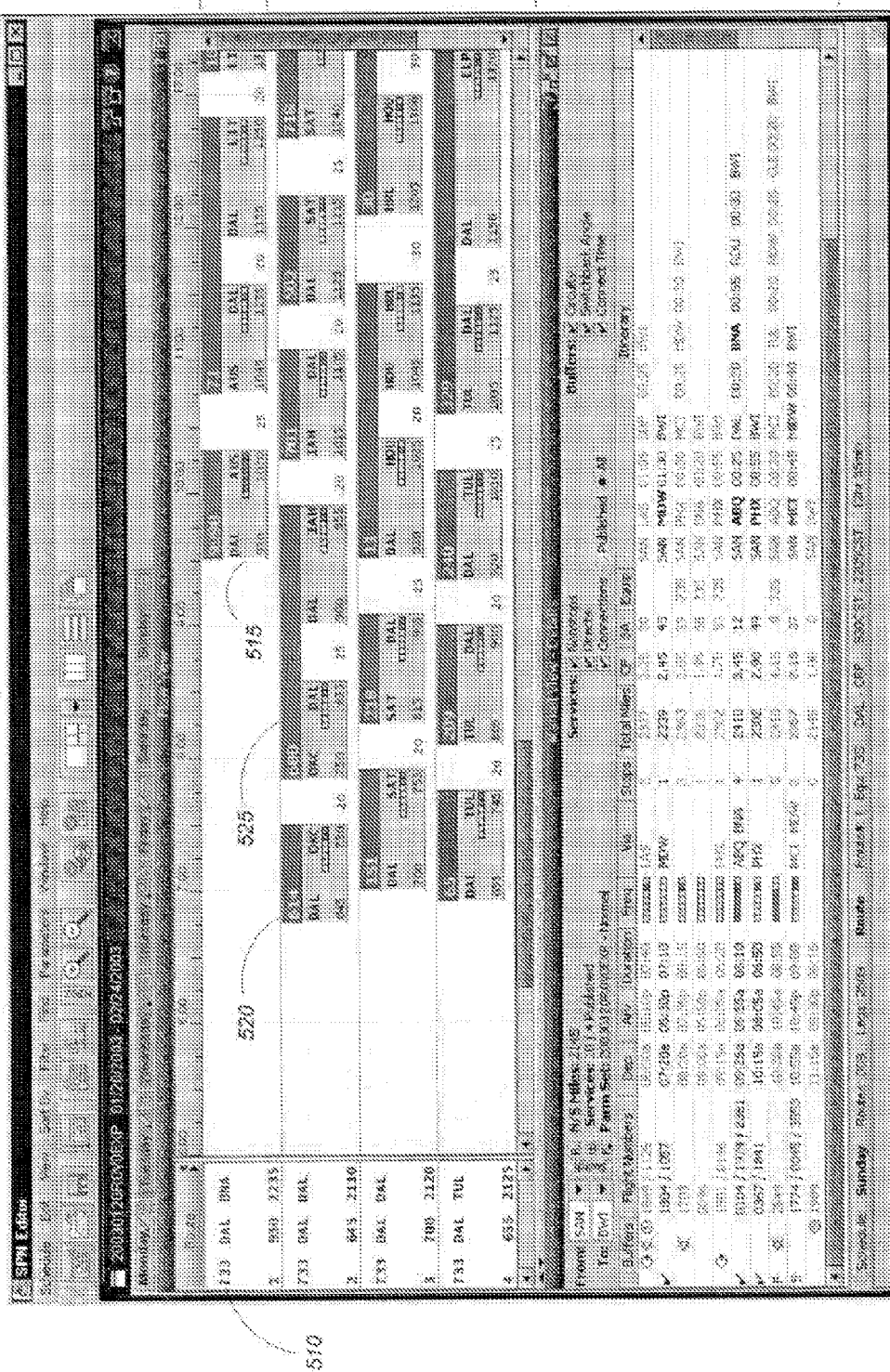
FIG. 5 illustrates a computer-generated display of information relating to a schedule.

FIG. 5 illustrates a computer-generated display to a computer user of a view of the schedule. In this view, a rotation 505 is displayed, showing details about the rotation including the equipment type 510 and individual flight segments 515 within the rotation 505. A flight number 520 for each flight segment is also displayed; if a flight number includes more than one flight segment (e.g., a direct flight), the direct flight number 525 is displayed across all flight segments for which it applies.

In addition, the computer user can view all connections between an origin station and a destination station, as part of a market view 530. The computer user can select the market to be displayed, what type of services are shown for the market (nonstop flights, direct flights, and/or connecting flights), as well as whether only published itineraries are displayed or all possible itineraries are displayed. In some implementations, if all possible connecting itineraries are displayed, connecting itineraries that fail or that fall within a buffer range for one or more of the validation rules (e.g., circuity, switchback angle, or connect time) can be displayed in a different fashion than connections that meet all of the validation rules, e.g., connecting itineraries that fail one or more of the validation rules are grayed out.

Manual changes to either the base schedule or the published schedule can be made by a user. These changes can then be reviewed and verified against one or more rules. For example, the computer-generated display illustrated in FIG. 5 can allow a user to enter modifications to one or more flight segments, e.g., changes to the departure time, arrival time, origin station, destination station, or equipment type for a particular flight segment, changes to the turn time (ground time) between flight segments, or the addition or deletion of entire flight segments. The system can automatically verify the modified schedule against one or more rules, e.g., compliance with Wright Amendment restrictions, and alert the user if any of the rules are not met. In some implementations, the system automatically verifies the schedule each time a manual change is made by the user. The user is then immediately notified if one of the user's changes or modifications causes the schedule to not comply with one or more rules. In other implementations, the system verifies the schedule upon request. For example, the verification can be performed by explicit user request, at predefined scheduled times or intervals, or upon the occurrence of particular events, e.g., exiting the system or saving the current schedule. Such an implementation can be particularly useful if the verification process is computationally intensive.

Similarly, a schedule can be verified to ensure compliance with maintenance, charter, or ground time requirements. For example, a specific aircraft may be required to arrive at a station with a maintenance facility (e.g., so that aircraft can periodically be taken out of service for maintenance) or at a specific station to provide charter (i.e., unscheduled) service. Various annotations can be included in the computer-generated display illustrated in FIG. 5 to alert the user to any flight segments that fail to comply with one or more of these requirements.

As above, this verification can be performed each time a manual change is made by the user, or upon request. In addition, the system can determine potential solutions to comply with maintenance, charter, or ground time requirements. Specifically, the system identifies one or more flight segments that are critical for satisfying these requirements. For example, if a specific rotation does not meet the ground time requirements, the system can suggest new times for various flight segments within the rotation to ensure compliance with the ground time requirements. These suggestions can be implemented automatically, or merely presented to the user as suggestions and potential solutions.

Figure 6:
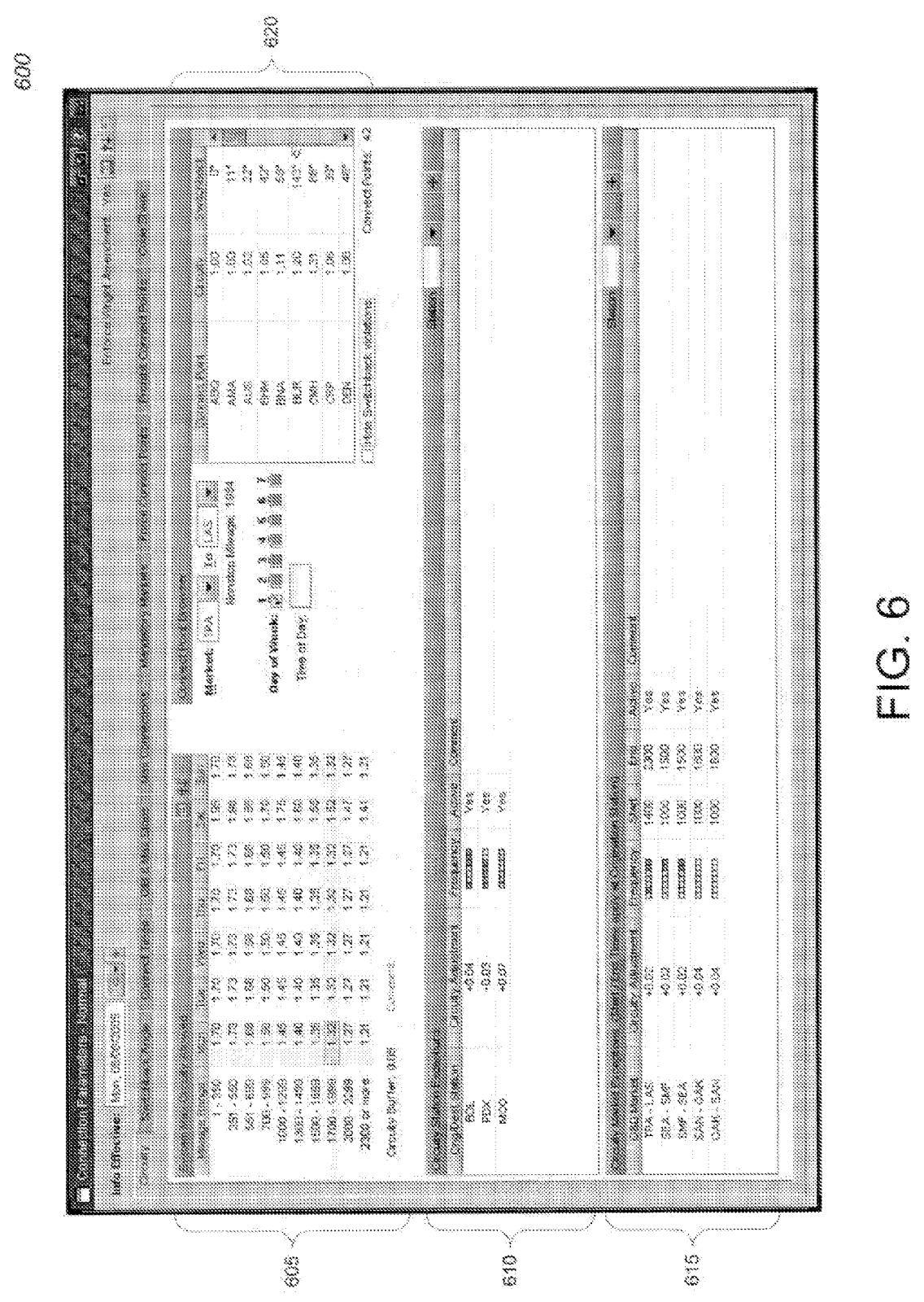

FIG. 6 shows an example of a form 600 that can be used to display connection parameters to a user, allow the user to enter connection parameters, or both. The form 600 allows the user to define the system maximum circuity allowed 605, both by the day of week as well as the mileage range of the specific market; in addition to defining circuity station exceptions 610 and circuity market exceptions 615. In addition, a connect point browser 620 allows the user to see the circuity and switchback angle for every possible connect point for a particular market pair, as well as if the circuity exceeds the permissible level defined by the connection parameters.

Figure 7:
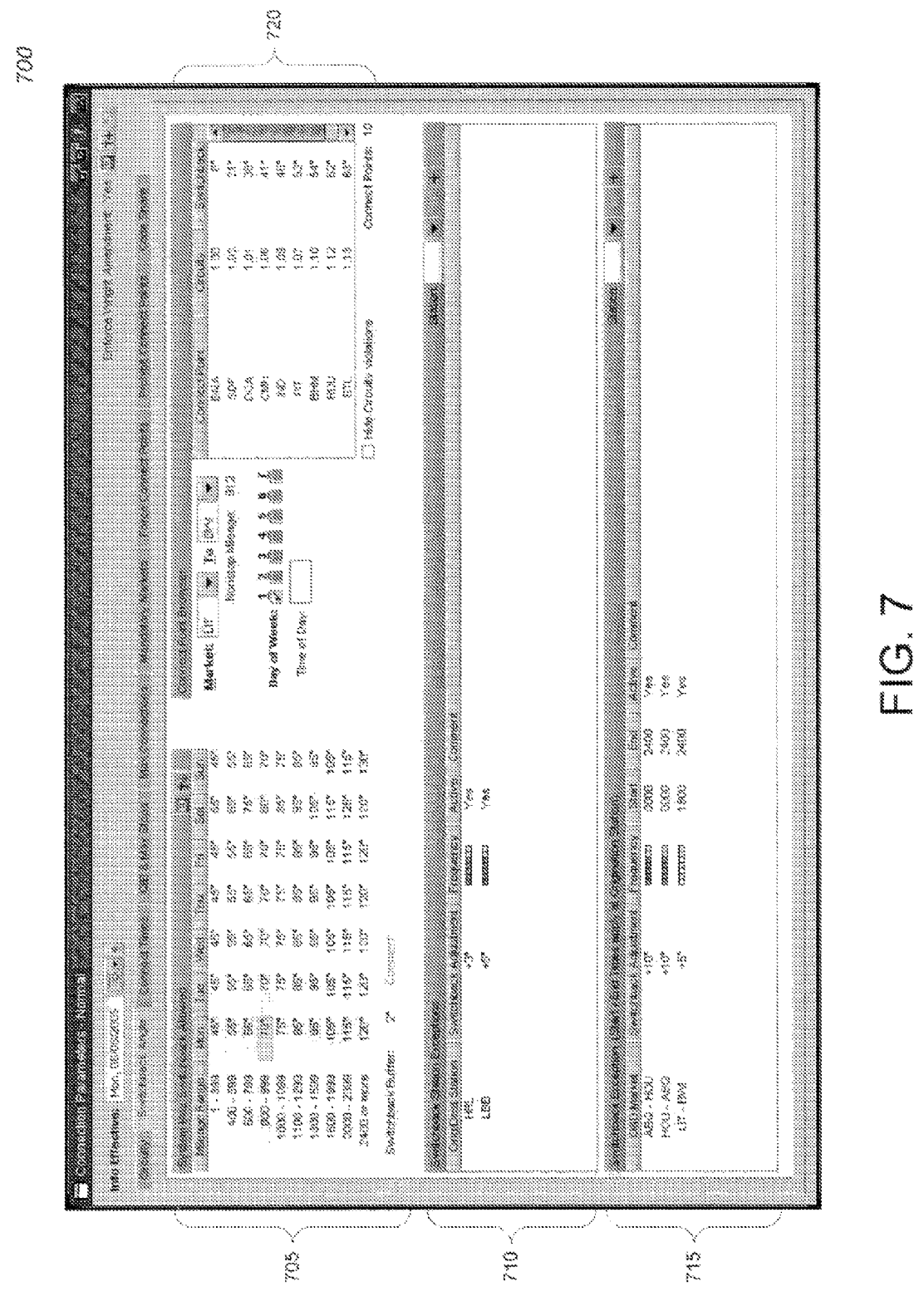

FIG. 7 shows an example of a form 700 that can be used to display connection parameters to a user, allow the user to enter connection parameters, or both. The form 700 allows the user to define the system maximum switchback angle allowed 705, both by the day of week as well as the mileage range of the specific market; in addition to defining switchback angle station exceptions 710 and switchback angle market exceptions 715. In addition, a connect point browser 720 allows the user to see the circuity and switchback angle for every possible connect point for a particular market pair, as well as if the switchback angle exceeds the permissible level defined by the connection parameters.

Implementations of the invention and all of the functional operations described in this specification can be implemented in digital electronic circuitry, or in computer software, firmware, or hardware, including the structures disclosed in this specification and their structural equivalents, or in combinations of them. Implementations of the invention can be implemented as one or more computer program products, i.e., one or more modules of computer program instructions encoded on a computer-readable medium, e.g., a machine-readable storage device, a machine-readable storage medium, a memory device, or a machine-readable propagated signal, for execution by, or to control the operation of, data processing apparatus. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular implementations of the invention have been described. Other implementations are within the scope of the following claims. For example, the actions recited in the claims can be performed in a different order and still achieve desirable results. In addition, although this description focuses on particular implementations of the invention in the context of aircraft, the invention can also be used for other types of transportation resources. For example, the techniques can be used to generate bus or train schedules. In addition, transportation resources are not necessarily limited to equipment used for transporting people but can also include, for example, equipment for transporting cargo or any set of objects or devices that travel between multiple locations in some coordinated manner. For example, the transportation resources can include a set of containers that are each routed through different sequences of locations.

What is claimed is:

1. A computer implemented method, comprising:

receiving a base schedule at a computer, the base schedule including a plurality of rotations, each rotation including one or more segments;

generating a set of itineraries based upon the segments in the base schedule, each itinerary including an origin, a destination, and one or more segments linking the origin and the destination, each segment representing a scheduled flight between a departure station and an arrival station, the set of itineraries including a first subset of one or more nonstop itineraries having one segment linking the origin and destination and a second subset of itineraries having a plurality of segments linking the origin and destination;

calculating, by operation of a computer, at least one of a circuity factor or a switchback angle for at least a subset of the set of itineraries, wherein the circuity factor is calculated as a comparison between an itinerary of the second subset of itineraries for a particular origin and destination and an itinerary of the first subset of nonstop itineraries for the particular origin and destination, and the switchback angle is calculated as an angle between a first imaginary line connecting a first departure station and a first arrival station for a first segment of an itinerary and a second imaginary line connecting a second departure station and a second arrival station of the itinerary, wherein the first arrival station is the same as the second departure station;

identifying constraints, including at least one of a maximum circuity factor or a maximum switchback angle, wherein different maximum circuity factors apply to different itineraries based on a distance between the origin and destination in each of the different itineraries, and wherein the maximum switchback angle is selected based on at least one of the origin, the destination, or the distance between the origin and destination; and automatically analyzing, by operation of a computer, the second subset of itineraries to identify one or more valid itineraries within the second subset of itineraries, each valid itinerary representing a possible sequence of segments allowing a passenger to travel from an origin to a destination, each valid itinerary complying with one or more constraints including at least one of the maximum circuity factor or the maximum switchback angle.

2. The method of claim 1, wherein the one or more valid itineraries represents a first set of publishable itineraries.

3. The method of claim 1, wherein the one or more constraints further include at least one constraint selected from the group consisting of a maximum number of segments, a required connection point between segments, or a prohibited connection point between segments.

4. The method of claim 1, wherein itineraries of a first type are subject to a first set of one or more constraints and itineraries of a second type are subject to a second set of one or more constraints.

5. The method of claim 1, further comprising:
analyzing a plurality of valid itineraries between a first origin and a first destination; and
identifying one or more preferred itineraries from the plurality of valid itineraries.

6. The method of claim 1, wherein each valid itinerary complies with at least the maximum circuity factor and the maximum switchback angle constraints.

7. The method of claim 1, wherein a first maximum circuity factor applies to itineraries spanning distances within a first range and a second maximum circuity factor applies to itineraries spanning distances within a second range.

8. The method of claim 5, wherein the one or more preferred itineraries represents a second set of publishable itineraries.

9. A computer program product, tangibly embodied on a non-transitory computer-readable storage device, the computer program product comprising instructions operable to cause data processing equipment to:
receive a set of parameters, the set of parameters including information about one or more gates at a station;
receive a flight schedule, the flight schedule identifying an arrival time for each flight arriving at the station and a departure time for each flight departing from the station;
automatically assign each flight arriving at the station or departing from the station a gate assignment based on the arrival time of each flight or the departure time of each flight, each gate assignment complying with one or more constraints, the one or more constraints including at least a gate buffer time for each gate, wherein the gate buffer time is a time required after a first flight leaves a particular gate before the particular gate can accept a second flight arriving at the station, wherein different gate buffer times apply to flights of different types, the different types of flights including originating flights, terminating flights, and other flights.

10. The computer program product of claim 9, wherein each flight segment departing from the station includes flight segments originating at the station.

11. The computer program product of claim 9, wherein each flight segment arriving at the station includes flight segments terminating at the station.

12. The computer program product of claim 9, wherein at least one of the one or more constraints is selected from the group consisting of gate availability, crew availability, remain overnight ("RON") availability, and equipment restrictions.

13. The computer program product of claim 9, wherein the computer program product further comprises instructions operable to:
assign originating flights across available gates at the station;
determine at least one originating flight to be assigned to a particular gate with a previously assigned originating flight;
determine a particular gate buffer time for the particular gate based on a hierarchy of originator separation time constraints, the originator separation time constraints including at least one of an originator separation time associated with the particular gate or an originator separation time associated with the station; and
assign the at least one originating flight to the particular gate with at least the particular gate buffer time separating the previously assigned originating flight and the at least one originating flight.

14. A system for generating a set of publishable itineraries, the system comprising:
a memory adapted to store a set of instructions;
a processor operable to perform operations according to the instructions stored in the memory, the operations including:
receiving a base schedule, the base schedule including a plurality of rotations, each rotation including one or more segments;
generating a set of itineraries based upon the segments in the base schedule, each itinerary including an origin, a destination, and one or more segments linking the origin and the destination, each segment representing a scheduled flight between a departure station and an arrival station, the set of itineraries including a first subset of one or more nonstop itineraries having one segment linking the origin and destination and a second subset of itineraries having a plurality of segments linking the origin and destination;
calculating at least one of a circuity factor or a switchback angle for at least a subset of the set of itineraries, wherein the circuity factor is calculated as a comparison between an itinerary of the second subset of itineraries for a particular origin and destination and an itinerary of the first subset of nonstop itineraries for the particular origin and destination, and the switchback angle is calculated as an angle between a first imaginary line connecting a first departure station and a first arrival station for a first segment of an itinerary and a second imaginary line connecting a second departure station and a second arrival station of the itinerary, wherein the first arrival station is the same as the second departure station; and automatically analyzing the second subset of itineraries to identify one or more valid itineraries within the second subset of itineraries, each valid itinerary representing a possible sequence of segments allowing a passenger to travel from an origin to a destination, each valid itinerary complying with one or more constraints, the one or more constraints including at least one of a maximum circuity factor or a maximum switchback angle, wherein different maximum circuity factors apply to different itineraries based on a distance between the origin and destination in each of the different itineraries, and wherein the maximum switchback angle is a maximum angle between two segments included in a particular itinerary, wherein an arrival station of a first of the two segments is a departure station of a second of the two segments.

15. The system of claim 14, wherein the one or more valid itineraries represents a first set of publishable itineraries.

16. The system of claim 14, wherein the one or more constraints further include at least one constraint selected from the group consisting of a maximum number of segments, a required connection point between segments, and a prohibited connection point between segments.

17. The system of claim 14, wherein itineraries of a first type are subject to a first set of one or more constraints and itineraries of a second type are subject to a second set of one or more constraints.

18. The system of claim 14, wherein the operations further include:

analyzing a plurality of valid itineraries between a first origin and a first destination; and identifying one or more preferred itineraries from the plurality of valid itineraries.

19. The system of claim 14, wherein each valid itinerary complies with at least the maximum circuity factor and the maximum switchback angle constraints.

20. The system of claim 18, wherein the one or more preferred itineraries represents a second set of publishable itineraries.

* * * * *